(12) United States Patent
Guen

(10) Patent No.: US 12,512,539 B2
(45) Date of Patent: Dec. 30, 2025

(54) SECONDARY BATTERY

(71) Applicant: Samsung SDI Co., Ltd., Yongin-si (KR)

(72) Inventor: Min Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 902 days.

(21) Appl. No.: 17/639,479

(22) PCT Filed: Sep. 10, 2020

(86) PCT No.: PCT/KR2020/012264
§ 371 (c)(1),
(2) Date: Mar. 1, 2022

(87) PCT Pub. No.: WO2021/096048
PCT Pub. Date: May 20, 2021

(65) Prior Publication Data
US 2022/0336894 A1 Oct. 20, 2022

(30) Foreign Application Priority Data

Nov. 12, 2019 (KR) .................. 10-2019-0144546

(51) Int. Cl.
*H01M 50/131* (2021.01)
*H01M 50/103* (2021.01)
*H01M 50/15* (2021.01)

(52) U.S. Cl.
CPC ....... *H01M 50/131* (2021.01); *H01M 50/103* (2021.01); *H01M 50/15* (2021.01)

(58) Field of Classification Search
CPC .. H01M 50/131; H01M 50/103; H01M 50/15; H01M 50/55; H01M 50/119;
(Continued)

(56) References Cited

U.S. PATENT DOCUMENTS 9,583,741 B2   2/2017 Seong et al.
9,853,253 B2   12/2017 Seong
(Continued)

FOREIGN PATENT DOCUMENTS

CN    201812868 U    4/2011
CN    103165839 A    6/2013
(Continued)

OTHER PUBLICATIONS

European Search Report for EP Application No. 20887488.3 dated Nov. 13, 2023, 9 pages.
(Continued)

*Primary Examiner* — Matthew T Martin
*Assistant Examiner* — Bartholomew A Hornsby
(74) *Attorney, Agent, or Firm* — Womble Bond Dickinson (US) LLP

(57) ABSTRACT

The present invention relates to a secondary battery, and the technical problem to be solved is to provide a secondary battery having the reduced thickness, having no thickness deviation by regions due to high dimensional accuracy, and being capable of improving the strength of a cell bottom portion and cell side portions (a long side portion and a short side portion) and the cooling efficiency. To this end, disclosed is a secondary battery comprising: an electrode assembly; a case in which the electrode assembly is accommodated; and a cap assembly coupled to the case for sealing the case. The case comprises a bottom portion, a long side portion bent and extending from the bottom portion, a short side portion bent and extending from the long side portion, and a side bent portion provided between the long side portion and the short side portion, wherein the side bent portion has a radius of curvature increasing as it goes farther away from the bottom portion.

10 Claims, 6 Drawing Sheets

(58) Field of Classification Search
CPC .... H01M 50/169; H01M 10/04; H01M 50/10; H01M 50/136; H01M 50/109; H01M 50/11; H01M 50/102; H01M 50/148; H01M 50/159; H01M 50/202; H01M 50/209; H01M 50/216; H01M 50/224; H01M 50/238; H01M 50/258; H01M 50/26; Y02E 60/10

See application file for complete search history.

(56) References Cited

U.S. PATENT DOCUMENTS

| | | | |
|---|---|---|---|
| 10,290,848 B2 | 5/2019 | Zou et al. | |
| 2015/0010809 A1* | 1/2015 | Seong | H01M 50/103 429/163 |
| 2015/0228933 A1 | 8/2015 | Seong | |
| 2016/0141563 A1 | 5/2016 | Zou et al. | |
| 2017/0047571 A1* | 2/2017 | Iwasaki | H01M 50/103 |
| 2019/0036088 A1* | 1/2019 | Wakimoto | H01M 50/103 |

FOREIGN PATENT DOCUMENTS

| | | | |
|---|---|---|---|
| CN | 104282849 A | | 1/2015 |
| CN | 104362292 A | | 2/2015 |
| CN | 207407520 U | | 5/2018 |
| JP | 2013-125737 A | | 6/2013 |
| JP | 2017200707 A | * | 11/2017 |
| JP | 2019-029218 A | | 2/2019 |
| KR | 10-0646509 B1 | | 11/2006 |
| KR | 10-1440893 B1 | | 9/2014 |
| KR | 10-2015-0095145 A | | 8/2015 |

OTHER PUBLICATIONS

International Search Report for corresponding Application No. PCT/KR2020/012264 dated Dec. 18, 2020, 4pp.

Chinese Office Action, with English translation, dated Dec. 11, 2023, issued in corresponding Chinese Patent Application No. 202080065856.0 (12 pages).

* cited by examiner

SECONDARY BATTERY

CROSS-REFERENCE TO RELATED APPLICATION(S)

This application is a U.S. National Phase Patent Application of International Application No. PCT/KR2020/012264, filed on Sep. 10, 2020, which claims priority to Korean Application No. 10-2019-0144546, filed Nov. 12, 2019, the entire content of each of which is incorporated herein by reference.

TECHNICAL FIELD

The present invention relates to a secondary battery.

BACKGROUND ART

Batteries may be classified into a rectangular shape, a cylindrical shape, a pouch type, and the like according to a shape. A prismatic or cylindrical battery is manufactured by inserting an electrode assembly having a positive electrode, a negative electrode, and a separator into a metal can and then sealing same, whereas a pouch type battery may be manufactured by wrapping an electrode assembly with an aluminum foil coated with an insulator.

A conventional method for manufacturing a battery can may include a deep drawing method, an impact method, and the like. For example, in the deep drawing method, a sheet-shaped metal plate is placed on a molding die, and punching is applied to the metal plate approximately 10 times by means of a punch, completing the can. As another example, in the impact method, a slug in the form of a billet is placed on a molding die, and strong punching is applied to the slug approximately one time by means of a punch, thereby completing the can. The impact method can reduce the number of process steps, thereby lowering the manufacturing cost of the can.

However, both of the conventional deep drawing method and impact method have limitations in thinning the thickness of a can due to characteristics of the manufacturing process, and there is a problem in that the thickness of the can varies greatly depending on the area of the can. In addition, the conventional method has a problem in that the manufacturing cost of the can is also high.

The above information disclosed in this Background section is only for enhancement of understanding of the background of the invention and therefore it may contain information that does not constitute prior art.

DESCRIPTION OF EMBODIMENTS

Technical Problem

The present invention provides a secondary battery, and the technical problem to be solved is to provide a secondary battery having the reduced thickness, having no thickness deviation by regions due to high dimensional accuracy, and being capable of improving the strength of a cell bottom portion and cell side portions (a long side portion and a short side portion) and the cooling efficiency.

Solution to Problem

A secondary battery according to the present invention comprises: an electrode assembly; a case in which the electrode assembly is accommodated; and a cap assembly coupled to the case for sealing the case, wherein the case comprises a bottom portion, a long side portion bent and extending from the bottom portion, a short side portion bent and extending from the long side portion, and a side bent portion provided between the long side portion and the short side portion, wherein the side bent portion has a radius of curvature increasing as it goes farther away from the bottom portion.

The short side portion may include a first short side portion bent and extending from the bottom portion, and a second short side portion bent and extending from the long side portion, and the first short side portion and the second short side portion may be connected to each other.

The secondary battery may further include a welding portion provided between the first short side portion and the second short side portion.

The radius of curvature of the side bent portion may gradually increase from 1.2 mm to 3.0 mm.

A long side bent portion may be provided between the bottom portion and the long side portion, a short side bent portion may be provided between the bottom portion and the short side portion, and the long side bent portion and the short side bent portion may have a constant (equal) radius of curvature.

The long-side bent portion and the short-side bent portion may have a radius of curvature equal to or smaller than a smallest radius of curvature of the side bent portion.

The radius of curvature of the long side bent portion and the short side bent portion may be 1.0 mm to 1.2 mm.

The width of the side bent portion may gradually increase as it goes farther away from the bottom portion.

The width of the long side portion may gradually decrease as it goes farther away from the bottom portion.

The width of the short side portion may gradually decrease as it goes farther away from the bottom portion.

Advantageous Effects of Disclosure

The present invention can provide a secondary battery having a reduced thickness, having no thickness deviation by regions due to high dimensional accuracy, and being capable of improving the strength of a cell bottom portion and cell side portions (a long side portion and a short side portion) and the cooling efficiency.

In some examples, according to the present invention, the radius of curvature of the bent portion formed between the cell bottom portion and the cell side portion (long side portion and short side portion) is constant (same), and the bent portion formed between the cell side portion, that is, the cell long side portion and the cell short side portion, thereby providing a secondary battery having improved strength and/or cooling performance according to an increase in the area of the cell bottom portion and the cell side portion.

In some examples, according to the present invention, the radius of curvature of the bent portion formed between the cell long side portion and the cell short side portion gradually increases as the bent portion goes farther away from the bottom portion, and thus the spring-back phenomenon can be reduced during bending of the can (case), thereby providing a secondary battery having a reduced welding failure phenomenon.

BEST MODE

Figure 1:
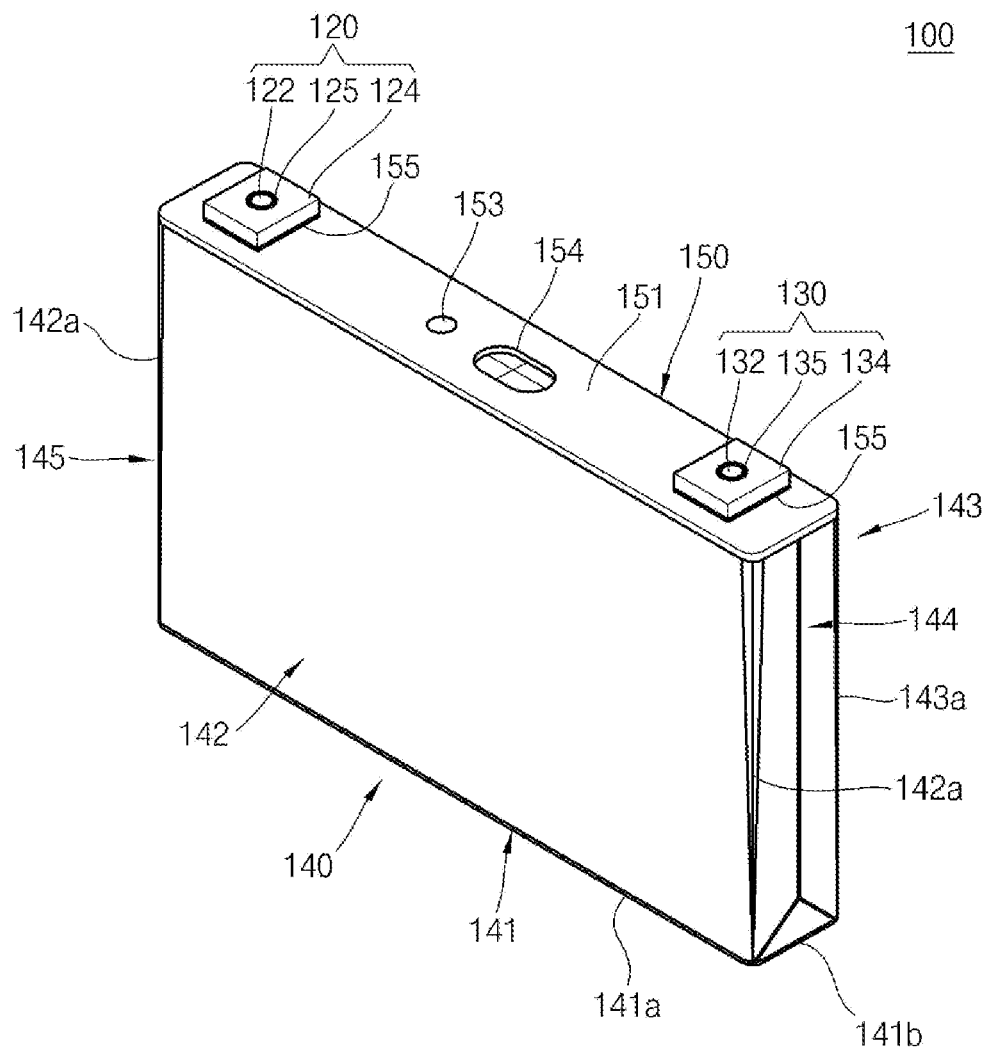
FIG. 1 is a perspective view illustrating an exemplary secondary battery.

Hereinafter, preferred embodiments of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this disclosure will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Meanwhile, in the present specification, the first, second, and third short side portions may be integrated as a short side portion, and the second and third short side portions may be integrated and referred to as the second short side portions. This is for convenience of understanding of the present invention, and is not intended to limit the invention. In addition, in this specification, the bent portion may be referred to as a curved portion in some cases. In addition, in this specification, the welding portion may be referred to as a temporary welding portion and/or a main welding portion. This is intended to indicate the order and function of welding, and is not intended to limit the invention. Further, in the present specification, welding mainly refers to laser welding, and may include, but is not limited to, a CO2 laser, a fiber laser, a disk laser, a semiconductor laser, and/or a Yttrium Aluminum Garnet (YAG) laser.

FIG. 1 is a perspective view illustrating an exemplary secondary battery. In the example shown in FIG. 1, the secondary battery 100 may include electrode assemblies 110 and 210 (see FIGS. 2A and 2B), a first terminal 120, a second terminal 130, a can 140, and a cap assembly 150.

In some examples, the can 140 may be formed by blanking and/or notching, bending, and welding a metal plate, and may have a substantially hexahedral shape having an opening in which the electrode assembly can be accommodated and the cap assembly 150 can be seated. In some examples, the can 140 may include or be referred to as a case, housing, container, or body.

In some examples, the can 140 has a substantially rectangular bottom portion 141 having a long side and a short side, long side portions 142 and 143 having substantially rectangular or square long side portions bent and extending from the respective long sides of the bottom portion 141 toward the cap assembly 150, and substantially rectangular short side portions 144 and 145 bent and extending from the respective short sides of the bottom portion 141 toward the cap assembly 150.

FIG. 1 shows the can 140 and the cap assembly 150 in a coupled state, so that the opening is not shown, but the region corresponding to the cap assembly 150 may be a substantially open portion. Meanwhile, an inner surface and/or an outer surface of the can 140 may be insulated and thus can be insulated from the electrode assembly, the first terminal 120, the second terminal 130, and the cap assembly 150.

In addition, as will be described again below, the can 140 may further include long side bent portions 141a formed between the bottom portion 141 and the long side portions 142 and 143, respectively, and short side bent portions 141b respectively formed between the bottom portion 141 and the short side portions 144 and 145. Here, the radii of curvature of the long-side bent portions 141a and the short-side bent portions 141b may be constant (same).

In addition, as will be described again below, the can 140 may further include side bent portions 142a and 143a formed between the long side portions 142 and 143 and the short side portions 144 and 145. Here, the radii of curvature of the side bent portions 142a and 143a may gradually increase as the side bent portions 142a and 143a go farther away from the bottom portion 141 (that is, closer to the cap assembly 150).

In some examples, the radii of curvature of the long side bent portions 141a and the short side bent portions 141b are equal to or smaller than the smallest radius of curvature of the side bent portions 142a and 143a.

Figure 2A:
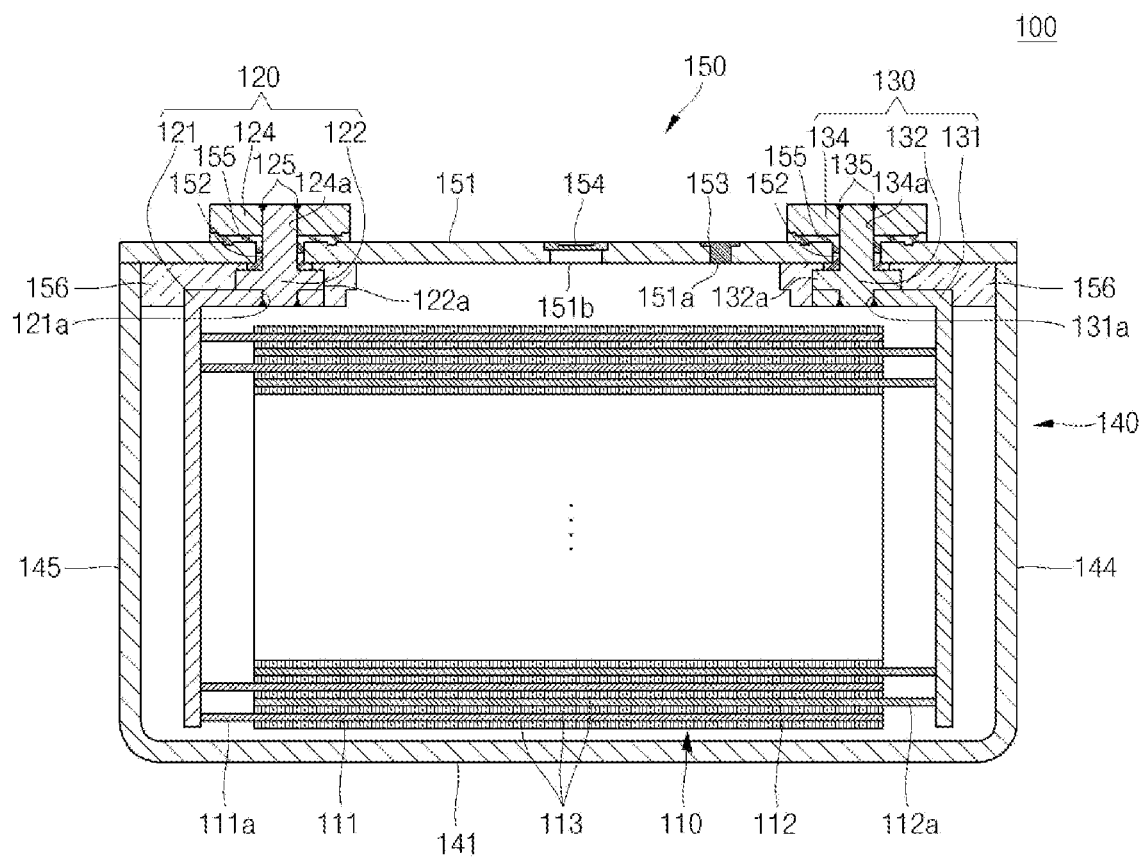
FIGS. 2A and 2B are cross-sectional views illustrating exemplary secondary batteries.
Figure 2B:
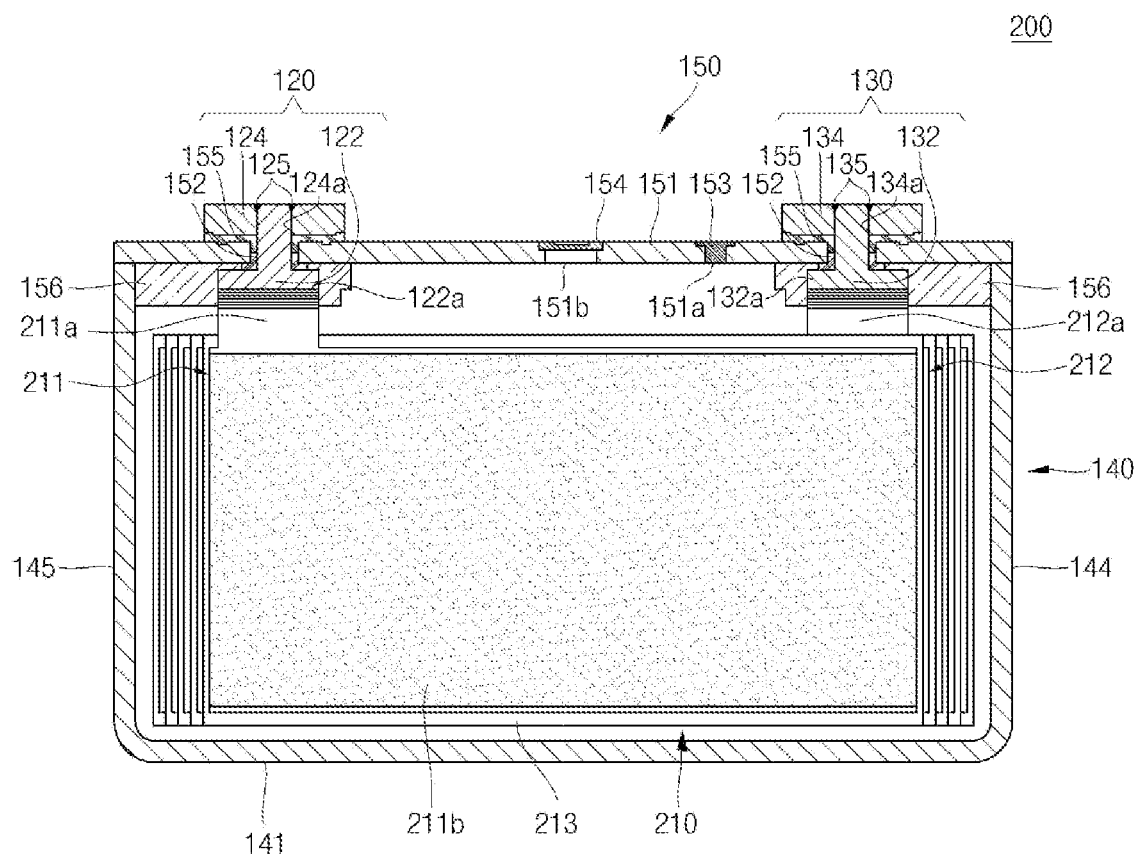

FIGS. 2A and 2B are cross-sectional views illustrating exemplary secondary batteries 100 and 200. In the example shown in FIG. 2A, the secondary battery 100 may include an electrode assembly 110 in which the winding axis is in a horizontal direction (i.e., a direction substantially parallel to the longitudinal direction of the cap assembly 150), and in the example shown in FIG. 2B, the secondary battery 200 may include an electrode assembly 210 in which the winding axis is in a vertical direction (i.e., a direction substantially perpendicular to the longitudinal direction of the cap assembly 150). In some examples, the electrode assembly may be a stack type, instead of a winding type.

The secondary battery 100 shown in FIG. 2A will be described. The electrode assembly 110 may be formed by winding or overlapping a stack of the first electrode plate 111, the separator 113, and the second electrode plate 112 formed in a thin plate shape or a film shape. In some examples, The first electrode plate 111 may serve as a negative electrode, and the second electrode plate 112 may serve as a positive electrode, or vice versa. In some examples, The first electrode plate 111 is formed by coating a first electrode active material, such as graphite or carbon, on a first electrode current collector formed of a metal foil, such as copper, copper alloy, nickel or nickel alloy, and may include a first electrode uncoated region 111a which is a region to which the first electrode active material is not applied. In some examples, the second electrode plate 112 is formed by coating a second electrode active material, such as a transition metal oxide, on a second electrode current collector formed of a metal foil, such as aluminum or aluminum alloy, and may include a second electrode uncoated region 112a which is a region to which the second electrode active material is not applied. In some examples, the separator 113 is positioned between the first electrode plate 111 and the second electrode plate 112 to prevent short circuit and enable the movement of lithium ions, and may include polyethylene, polypropylene, or a composite film of polyethylene and polypropylene. In addition, the separator 113 may be replaced with an inorganic solid electrolyte such as a sulfide, oxide or phosphate compound that does not require a liquid or gel electrolyte.

The first terminal 120 and the second terminal 130 electrically connected to the first electrode plate 111 and the second electrode plate 112, respectively, are positioned at opposite ends of the electrode assembly 110. In some examples, the electrode assembly 110 may be accommodated in the can 140 together with the electrolyte. In some examples, the electrolyte may include a lithium salt, such as LiPF6 or LiBF4 in an organic solvent, such as EC, PC, DEC, EMC, or DMC. Also, the electrolyte may be in a liquid or gel phase. In some examples, when an inorganic solid electrolyte is used, the electrolyte may be omitted.

The first terminal 120 may be formed of a metal and may be electrically connected to the first electrode plate 111. In some examples, The first terminal 120 may include a first current collecting plate 121, a first terminal pillar 122, and a first terminal plate 124. In some examples, The first current collecting plate 121 may be in contact with the first electrode uncoated region 111a protruding from one end of the electrode assembly 110. Substantially, the first current collecting plate 121 may be welded to the first electrode uncoated region 111a. In some examples, The first current collecting plate 121 is formed in an approximately "L" shape, and a terminal hole 121a may be formed in an upper portion thereof. In some examples, the first terminal pillar 122 may be inserted into the terminal hole 121a to be riveted and/or welded. In some examples, the first current collecting plate 121 may be made of copper or a copper alloy. In some examples, the first terminal pillar 122 may protrude and extend upward a predetermined length through a cap plate 151 to be described later, and may be electrically connected to the first current collecting plate 121 under the cap plate 151. In addition, in some examples, the first terminal pillar 122 may protrude and extend to an upper portion of the cap plate 151 by a predetermined length, and at the same time, a flange 122a may be formed at a lower portion of the cap plate 151 so as to prevent the first terminal pillar 122 from being dislodged from the cap plate 151. A region of the first terminal pillar 122 positioned below the flange 122a may be inserted into the first terminal hole 121a of the first current collecting plate 121 and then riveted and/or welded. In some examples, the first terminal pillar 122 may be electrically insulated from the cap plate 151. In some examples, the first terminal pillar 122 may be made of copper, a copper alloy, aluminum, or an aluminum alloy. The first terminal plate 124 has a hole 124a, and the first terminal pillar 122 may be coupled to the hole 124a and riveted and/or welded thereto. In some examples, boundary regions of the first terminal pillar 122 exposed upward and the first terminal plate 124 may be welded to each other. For example, a laser beam is provided to a boundary region between the first terminal pillar 122 and the first terminal plate 124 exposed upward, and thus the boundary region may be melted and then cooled and welded. The welding region is indicated by reference numeral 125 in FIG. 2A. Meanwhile, a busbar (not shown) made of aluminum or an aluminum alloy may be welded to the first terminal plate 124.

The second terminal 130 is also made of metal, and may be electrically connected to the second electrode plate 112. In some examples, the second terminal 130 may include a second current collecting plate 131, a second terminal pillar 132, and a second terminal plate 134. The second current collecting plate 131 may be in contact with the second electrode uncoated region 112a protruding from one end of the electrode assembly 110. In some examples, the second current collecting plate 131 is formed in an approximately "L" shape, and a terminal hole 131a may be formed at an upper portion. In some examples, the second terminal pillar 132 is fitted and coupled to the terminal hole 131a. The second current collecting plate 131 may be made of, for example, aluminum or an aluminum alloy, but not limited thereto. The second terminal pillar 132 may protrude and extend upward a predetermined length through the cap plate 151 to be described later, and may also be electrically connected to the second current collecting plate 131 under the cap plate 151. The second terminal pillar 132 protrudes and extends to an upper portion of the cap plate 151 by a predetermined length, and at the same time, a flange 132a may be formed at a lower portion of the cap plate 151 so as to prevent the second terminal pillar 132 from being dislodged from the cap plate 151. A region of the second terminal pillar 132 positioned below the flange 132a may be inserted into the second terminal hole 131a of the second current collecting plate 131 and then riveted and/or welded. Here, the second terminal pillar 132 may be electrically insulated from the cap plate 151. In some examples, the second terminal pillar 132 may be formed of aluminum or an aluminum alloy. The second terminal plate 134 has a hole 134a. In addition, the second terminal plate 134 is coupled to the second terminal pillar 132. That is, the second terminal pillar 132 is coupled to the hole 134a of the second terminal plate 134. In addition, the second terminal post 132 and the second terminal plate 134 may be riveted and/or welded to each other. In some examples, boundary regions of the second terminal pillar 132 and the second terminal plate 134 exposed upward may be welded to each other. For example, a laser beam is provided to the boundary regions of the second terminal pillar 132 and the second terminal plate 134 exposed upward, and thus the boundary regions may be melted and then cooled and welded. In addition, a busbar (not shown) made of aluminum or an aluminum alloy may be welded to the second terminal plate 134. Here, the second terminal plate 134 may be electrically connected to the cap plate 151, and thus the cap plate 151 and the can 140 to be described below have the same polarity as the second terminal 130 (for example, a positive polarity).

The cap assembly 150 may be coupled to the can 140. In some examples, the cap assembly 150 may include a cap plate 151, a seal gasket 152, a stopper 153, a safety vent 154, an upper insulating member 155, and a lower insulating member 156. The cap plate 151 seals the opening of the can 140, and may be made of the same material as the can 140. In some examples, the cap plate 151 may be coupled to the can 140 by laser welding. Here, the cap plate 151 may have the same polarity as the second terminal 130 as described above, and thus the cap plate 151 and the can 140 may have the same polarity. The seal gasket 152 is formed between each of the first terminal pillar 122 and the second terminal pillar 132 and the cap plate 151 by using an insulating material to seal portions between each of the first terminal pillar 122 and the second terminal pillar 132 and the cap plate 151. The seal gasket 152 prevents external moisture from penetrating into the secondary battery 100 or prevents the electrolyte contained in the secondary battery 100 from leaking to the outside. The stopper 153 may seal an electrolyte injection hole 151a of the cap plate 151, and the safety vent 154 may be installed in a vent hole 151b of the cap plate 151 and may have a notch 154a formed to be opened at a set pressure. The upper insulating member 155 may be formed between each of the first terminal pillar 122 and the second terminal pillar 132 and the cap plate 151. In addition, the upper insulating member 155 is in close contact with the cap plate 151. Furthermore, the upper insulating member 155 may also be in close contact with the seal gasket 152. The upper insulating member 155 insulates the first terminal pillar 122 and the second terminal pillar 132 from the cap plate 151. The lower insulating member 156 is formed between each of the first and second current collecting plates 121 and 131 and the cap plate 151 to prevent unnecessary short circuit. That is, the lower insulating member 156 prevents a short circuit between the first current collecting plate 121 and the cap plate 151 and a short circuit between the second current collecting plate 131 and the cap plate 151.

The secondary battery 200 shown in FIG. 2B will be described. The secondary battery 200 differs from of the secondary battery 100 of the previous embodiment with respect to the electrode assembly 220 and the connection relationship between the electrode assembly 220 and the terminals 120 and 130. A first electrode tab 211a may be interposed between the electrode assembly 210 and the first terminal pillar 122 of the first terminal 120, and a second electrode tab 212a may be interposed between the electrode assembly 210 and the second terminal pillar 132 of the second terminal 130. That is, the first electrode tab 211a may extend from the upper end of the electrode assembly 210 toward the lower end of the first terminal pillar 122 in the first terminal 120 to then be electrically connected or welded to a flat flange 122a provided in the first terminal pillar 122. In addition, the second electrode tab 212a may extend from the upper end of the electrode assembly 210 toward the lower end of the second terminal pillar 132 in the second terminal 130 to then be electrically connected or welded to a flat flange 132a provided in the second terminal pillar 132. Substantially, the first electrode tab 211a may be a first uncoated region itself in a first electrode plate 211 of the electrode assembly 210, to which a first active material 211b is not applied, or a separate member connected to a first uncoated region. Here, the material of the first uncoated region is the same as that of the first electrode plate, and the material of the separate member may be one selected from nickel, nickel alloy, copper, copper alloy, aluminum, aluminum alloy, and equivalents thereof. In addition, substantially, the second electrode tab 212a may be a second uncoated region itself in a second electrode plate 212 of the electrode assembly 210, to which a second active material 212b is not applied, or a separate member connected to a second uncoated region. Here, the material of the second uncoated region is the same as that of the second electrode plate, and the material of the separate member may be one selected from aluminum, an aluminum alloy, nickel, a nickel alloy, copper, a copper alloy, and equivalents thereof.

As described above, since the winding axis of an electrode assembly and the terminal axis of a terminal are formed substantially parallel or horizontal to each other, the electrolyte impregnation property of the electrode assembly is excellent when electrolyte is injected, and the internal gas is quickly discharged to a safety vent during overcharging. In addition, since an electrode tab (an uncoated region itself or a separate member) of the electrode assembly is directly electrically connected to the terminal and thus the electrical path is shortened, the internal resistance of the secondary battery 100 is reduced and the number of components thereof is also reduced.

Meanwhile, the can 140 according to the exemplary manufacturing method described below may be applied to the aforementioned secondary batteries 100 and 200 shown in FIGS. 1, 2A, and 2B.

Figure 3A:
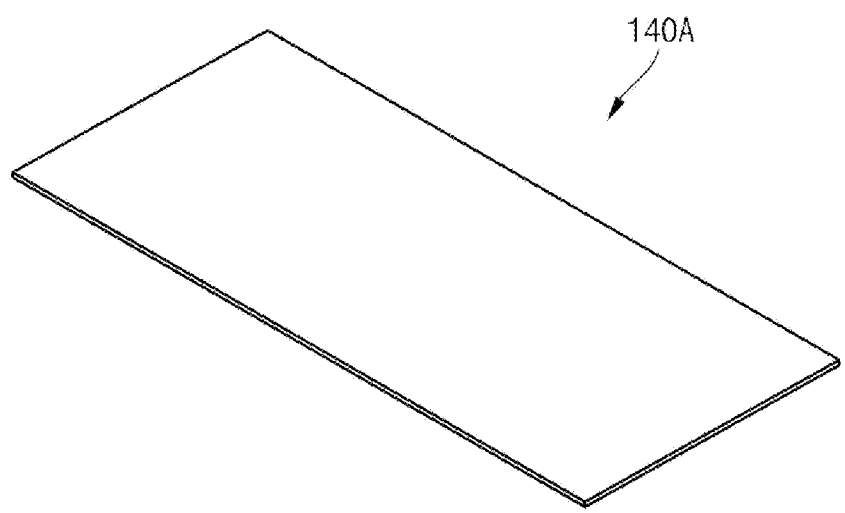
FIGS. 3A to 3F are perspective views of an exemplary method for manufacturing an exemplary secondary battery.

FIGS. 3A to 3F are perspective views of an exemplary method for manufacturing an exemplary secondary battery. FIG. 3A shows an initial stage for manufacturing the can 140.

In the example shown in FIG. 3A, an approximately flat metal plate 140A having a uniform thickness may be provided. In some examples, the metal plate 140A may include aluminum (Al), iron (Fe), copper (Cu), titanium (Ti), nickel (Ni), magnesium (Mg), chromium (Cr), manganese (Mn), zinc (Zn) or an alloy thereof. In some examples, the metal plate 140A may include nickel (Ni) plated iron (Fe) or SUS (e.g., SUS 301, SUS 304, SUS 305, SUS 316L, or SUS 321).

In addition, in some examples, the thickness of the metal plate 140A may be approximately 0.1 mm to approximately 10 mm, and the thickness deviation in all regions may be less than approximately 0.1% to approximately 1%. Therefore, the present invention may provide the can 140 that is thinner and has a smaller thickness variation than in the related art.

In addition, in some examples, the metal plate 140A may be pretreated so that a blanking process, a notching process, a bending process, and/or a welding process to be described below can be easily performed. In some examples, the metal plate 140A may be annealed for a specific time in a specific temperature range in a specific gas atmosphere. In some examples, the annealing treatment may be performed in an atmosphere of inert gas, such as argon (Ar) or nitrogen (N2), and at a temperature of approximately 300° C. to approximately 1000° C. for approximately 10 seconds to 60 minutes. The elastic modulus of the metal plate 140A may be increased by approximately 5% to approximately 60% by the annealing process, thereby facilitating the bending process of the metal plate 140A to be described below. In particular, after the bending process, a spring-back phenomenon may be minimized.

In addition, the metal plate 140A may include an approximately flat upper surface and an approximately flat lower surface, and the upper surface and/or the lower surface may be subjected to insulation treatment. In some examples, a thin oxide film (e.g., an anodizing layer) may be formed on the upper surface and/or lower surface of the metal plate 140A by a metal oxidation process, or an insulating resin (e.g., polyimide, polypropylene, or polyethylene) may be coated or laminated to form a thin insulating film. In some examples, the upper surface of the metal plate 140A may correspond to the inner surface of the can 140, and the lower surface of the metal plate 140A may correspond to the outer surface of the can 140. The features of the metal plate 140A may be commonly applied to all metal plates disclosed in the following embodiments.

Figure 3B:
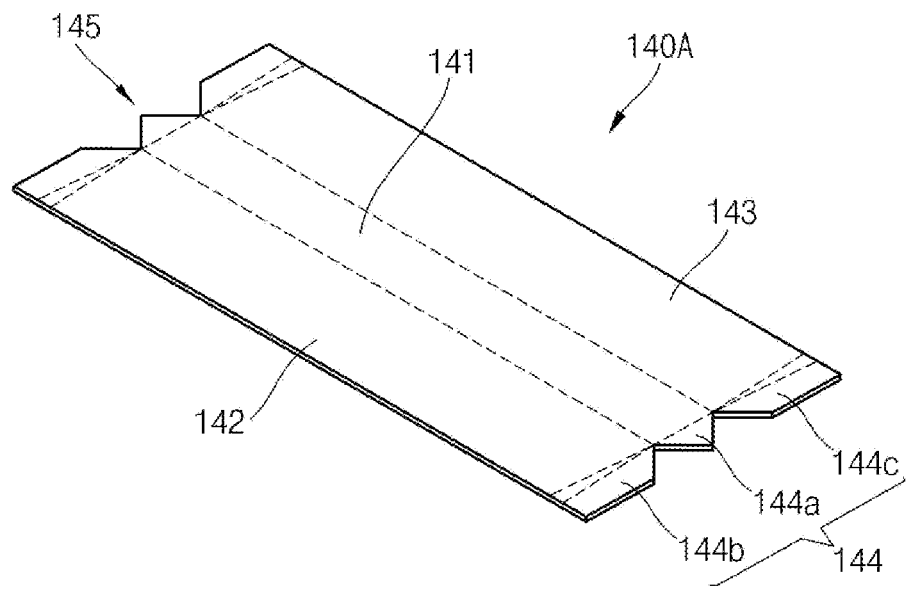

FIG. 3B shows a later stage for manufacturing the can 140.

In the example shown in FIG. 3B, an approximately flat metal plate 140A having a uniform thickness may be provided by a blanking method and/or a notching method. In some examples, the metal plate 140A may include a substantially rectangular bottom portion 141 having long sides and short sides, long side portions 142 and 143 (which will later be bent from the bottom portion) extending in the horizontal direction from each of the long sides of the bottom portion 141, and short side portions 144 and 145 (which will later be bent from the bottom portion and the long side portion, respectively) extending in the horizontal direction from the bottom portion 141 and the long side portions 142 and 143, respectively.

In some examples, one short side portion 144 may include a first short side portion 144a extending from a short side of the bottom portion 141 in an approximately triangular shape, a second short side portion 144b extending from one long side portion 142 in a horizontal direction, and a third short side portion 144c extending from the other long side portion 143 in the horizontal direction. Here, the second short side portion 144b may include an inclined perimeter formed in the region facing the first short side portion 144a, and the third short side portion 144c may also include an inclined perimeter formed in the region facing the first short side portion 144a. In other words, the second and third short side portions 144b and 144c may be shaped to match the first short side portion 144a. In addition, the width of each of the long side portions 142 and 143 may be approximately the same as the long side width of the bottom portion 141. In addition, the width of the first short side portion 144a may be substantially the same as the width of the short side of the bottom portion 141. In addition, the sum of the widths of the second and third short side portions 144b and 144c may be substantially the same as the width of the short side of the bottom portion 141. In addition, the lengths of the long side portions 142 and 143 may be substantially the same as the lengths of the short side portions 144 and 145. In FIG. 3B, dotted lines show lines to be bent in a subsequent process to be described below.

Figure 3C:
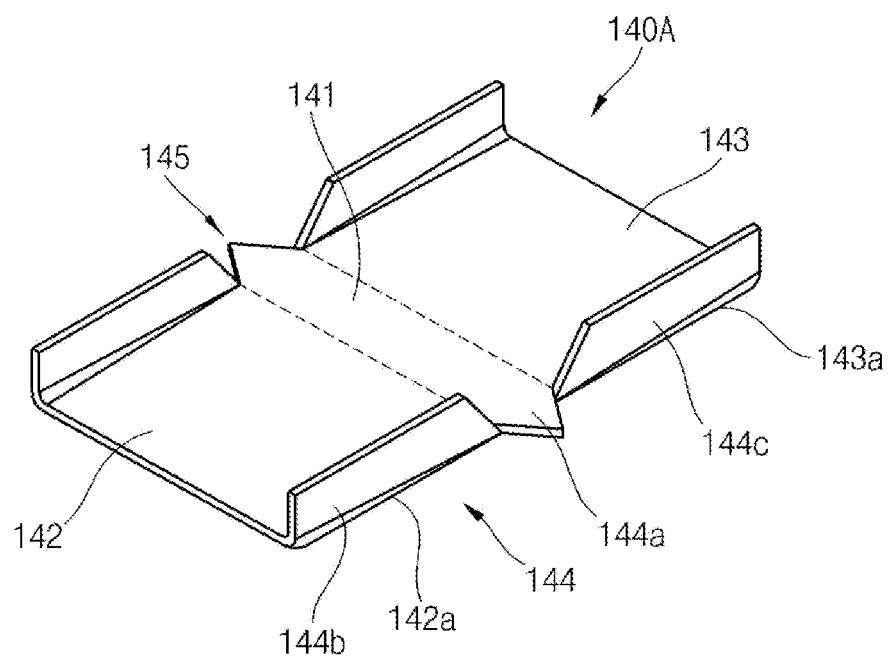
Figure 3D:
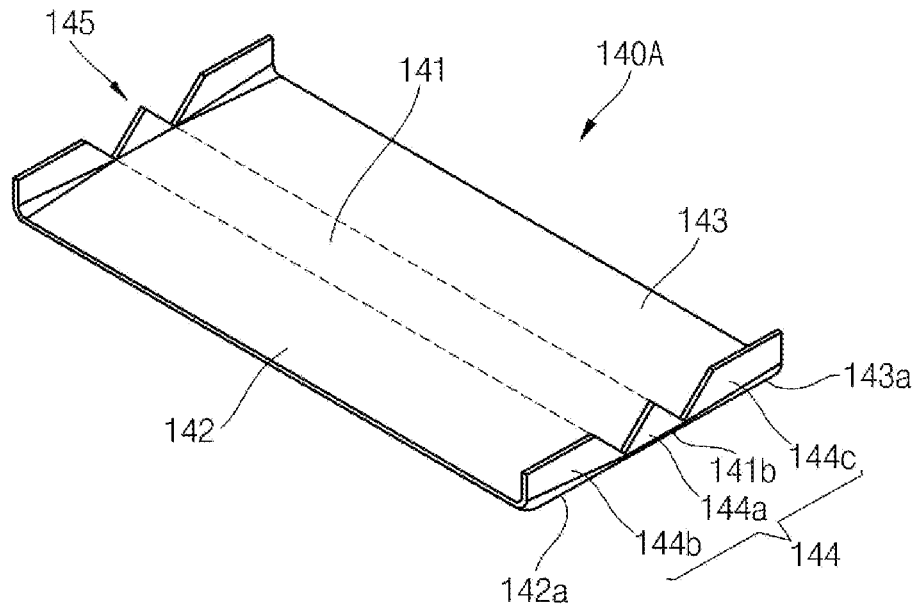

FIGS. 3C and 3D show later stages for manufacturing the can 140.

In the example shown in FIGS. 3C and 3D, the metal plate 140A may be bent in a predetermined shape. In some examples, the metal plate 140A may be bent in a predetermined shape after being fixed to a bending machine or a press mold.

In some examples, the short side portions 144 and 145 that are bent at substantially right angles and extend from the bottom portion 141 and the long side portions 142 and 143, respectively, may be formed by the bending process. That is, the short side portions 144 and 145 may be bent by approximately 90 degrees from the short side of the bottom portion 141 and extend and may also be bent by approximately 90 degrees from the long side portions 142 and 143 and extend.

In some examples, a short side bent portion 141b may be formed between the first short side portion 144a and the bottom portion 141, a side bent portion 142a may be formed between the second short side portion 144b and the long side portion 142, and a side bent portion 143a may be formed between the third short side portion 144c and the long side portion 143.

Here, the radius of curvature of the short-side bent portion 141b may be constant (the same or without a change), while radii of curvature of the side bent portions 142a and 143a gradually increase as the side bent portions 142a and 143a go farther away from the bottom portion 140 or the first short side portion 144a. In some examples, the radius of curvature of the short-side bent portion 141b may be equal to or smaller than a smallest radius of curvature of the side bent portion 142a, 143a.

In some examples, the radius of curvature of the short-side bent portion 141b may be approximately 1.0 mm to approximately 1.2 mm, and the radii of curvature of the side bent portions 142a and 143a may gradually increase from approximately 1.2 mm to approximately 3.0 mm.

Although the first short side portion 144a bent from the bottom portion 141 after the second and third short side portions 144b and 144c are bent from the long side portions 142 and 143 is shown in the drawing, the other way around is also possible.

Figure 3E:
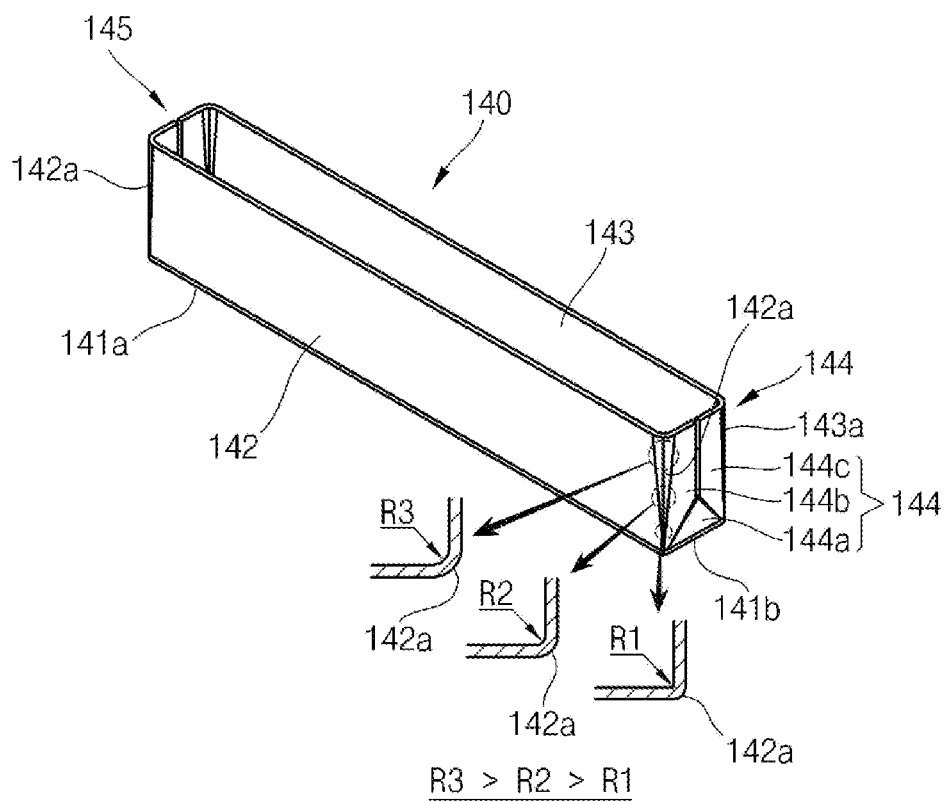

FIG. 3E shows a later stage for manufacturing the can 140.

In the example shown in FIG. 3E, the long side portions 142 and 143 may be bent at substantially right angles and extend from the respective long sides of the bottom portion 141 by the bending process. In some examples, the long side bent portion 141a may be formed between the bottom portion 141 and each of the long side portions 142 and 143. Here, the radius of curvature of the long-side bent portion 141a may be constant (the same or without a change). In some examples, the radius of curvature of the long side bent portion 141a may be approximately 1.0 mm to approximately 1.2 mm. For example, the radius of curvature of the long side bent portion 141a may be equal to the radius of curvature of the short side bent portion 141b.

In this way, the long side portions 142 and 143 may be bent at approximately 90 degrees and extend from the long sides of the bottom portion 141 through the long side bent portion 141a, and the short side portions 144 and 145 may be bent at approximately 90 degrees and extend from the short sides of the bottom portion 141 through the short side bent portion 141b, and may be bent at approximately 90 degrees and extend from the long side portions 142 and 143 through the side bent portions 142a and 143a.

Meanwhile, FIG. 3E shows various curvature radii R1, R2, and R3 of the side bent portions 142a and 143a. As shown, the region of the side bent portions 142a and 143a closest to the bottom portion 141 has a smallest curvature radius R1, and the region of the side bent portions 142a and 143a farthest from the bottom portion 141 has a largest curvature radius R3. In addition, the curvature radius R2 for the approximately middle region of the side bent portions 142a and 143a may have a value between the curvature radii R1 and R2.

In addition, the horizontal widths of the side bent portions 142a and 143a may gradually increase as the side bent portions 142a and 143a go farther away from the bottom portion 141. Accordingly, the horizontal widths of the short side portions 144 and 145 and the horizontal widths of the long side portions 142 and 143 may gradually decrease as the long side portions 142 and 143 go farther away from the bottom portion 141. In this way, the widths of the bottom portion 141, the long side portions 142 and 143, and the short side portions 144 and 145 are generally wider than those in the related art, thereby increasing the strengths of the bottom portion 141, the long side portions 142 and 143, and the short side portions 144 and 145 and improving cooling performance.

In addition, as described above, since the curvature radii of the side bent portions 142a and 143a gradually increase as the side bent portions 142a and 143a go farther away from the bottom portion 141, the spring-back phenomenon of the second short side portion 144b and the third short side portion 144c respectively bent from the long side portions 142 and 143 can be reduced during, thereby reducing a welding failure in a subsequent process.

Meanwhile, by the above-described bending process, the first short side portion 144a, the second short side portion 144b and the third short side portion 144c may face one another, and the respective perimeters may match or contact one another. Here, the vertex angle between the upper perimeter of the first short side portion 144a and the short side of the bottom portion 141 may be approximately 40 degrees to 50 degrees, preferably 45 degrees. In addition, the angle of the vertices facing the second and third short side portions 144b and 144c of the first short side portion 144a may be approximately 80 degrees to 100 degrees, preferably 90 degrees.

In some examples, the angle between the two upper perimeters of the first short side portion 144a and the short side of the bottom portion 141 is approximately 40 to 50 degrees, preferably 45 degrees, the angle between the perimeter of the second short side portion 144b facing the one-side perimeter of the first short side portion 144a and the one-side long side portion 142 is approximately 40 to 50 degrees, preferably 45 degrees, and the angle between the perimeter of the third short side portion 144c facing the other-side perimeter of the first short side portion 144a and the other-side long side portion 143 is approximately 40 degrees to 50 degrees, preferably 45 degrees, so that the vertex where the bottom portion 141, the one-side long side portion 142, the first short side portion 144a and the second short side portion 144b meet, and the vertex where the bottom portion 141, the other-side long side portion 143, the first short side portion 144a and the third short side portion 144c meet, may be bent in a substantially round shape A long side portion bent after a short side portion is bent is shown in the drawing, but, on the contrary, a short side portion may be bent after a long side portion is bent.

Figure 3F:
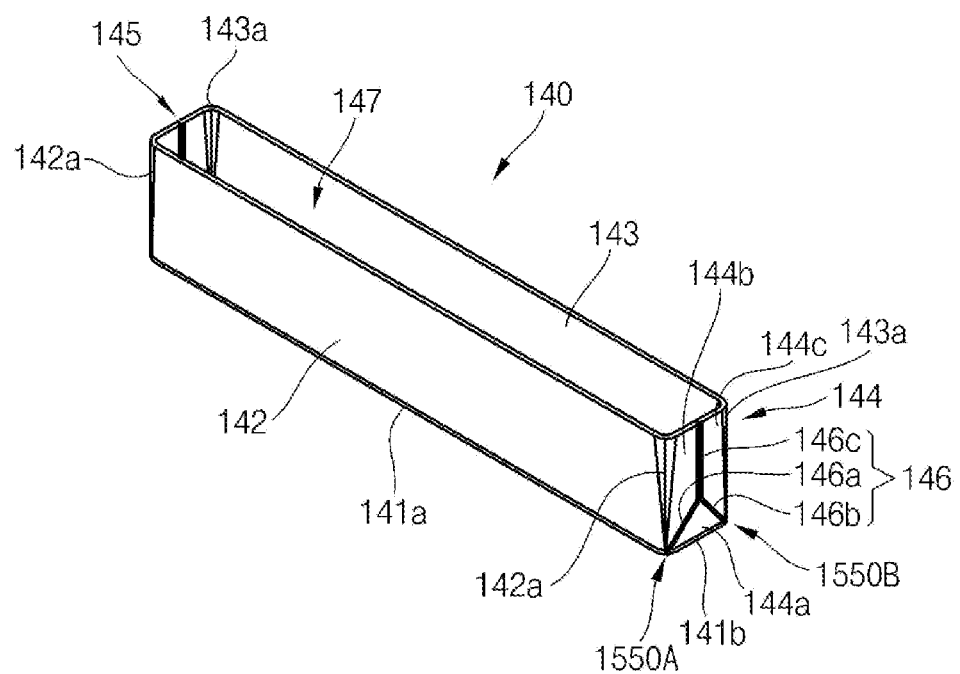

FIG. 3F shows a later stage for manufacturing the can 140. In the example shown in FIG. 3F, a welding process may be performed.

In some examples, a welding portion 146 may be formed in the short side portions 144 and 145. In some examples, the welding portion 146 may include: a first welded portion 146a formed on a boundary region between the first short side portion 144a and the second short side portion 144b, and on a curved portion 1550A formed at corners of the bottom portion 141, the long side portion 142, the first short side portion 144a and the second short side portion 144b; a second welded portion 146b formed on a boundary region between the first short side portion 144a and the third short side portion 144c and a curved portion 1550B formed at corners of the bottom portion 141, the long side portion 143, the first short side portion 144a, and the third short side portion 144c; and a third welding portion 146c formed on a boundary region between the second short side portion 144b and the third short side portion 144c.

The first welding portion 146a may be formed to have an acute angle with respect to the short side of the bottom portion 141 in the curved portion 1550A where the bottom portion 141, the one-side long side portion 142, the first short side portion 144a and the second short side portion 144b meet, and the second welding portion 146b may be formed to have an acute angle with respect to the short side of the bottom portion 141 in the curved portion 1550B where the bottom portion 141, the other-side long side portion 143, the first short side portion 144a and the third short side portion 144c meet. In addition, the third welding portion 146c may extend from lower ends of the second and third short side portions 144b and 144c to upper ends (i.e., an opening 147) of the second and third short side portions 144b and 144c.

In some examples, the first and second welding portions 146a and 646b may be continuously formed, and the third welding portion 146c may then be formed. The other way around is also possible. In addition, the welding process may be performed in the order of the first welding portion 146a, the third welding portion 146c, and the second welding portion 146b, and the other way around is also possible. In addition, the welding process of the third welding portion 146 may start from the lower end and may end at the upper end, and the other way around is also possible. In some examples, the first, second, and third welded portions 146a, 646b, and 646c may include a butt joint structure, an overlap joint structure, a cover-plate joint structure, or a corner joint structure. In some examples, the welding portion 146 may be formed in a substantially "inverted Y" shape. The welding portion 146 may be formed in a solid line shape. Therefore, the first short side portion 144a may be completely and securely fixed to the second and third short side portions 144b and 144c by the first and second welding portions 146a and 146b, and the second and third short side portions 144b and 144c (or the second short side portions 144b and 144c) may be securely and completely fixed to each other by the third welding portion 146c.

In other words, the first and second welding portions 146a and 146b connected to each other may be in a straight line shape having at least one vertex, and the third welding portion 146c may be in a straight line extending from the vertex of the first and second welding portions 146a and 146b to the opening 147. Here, the vertex of the first and second welding portions 146a and 146b may have an angle of approximately 80 degrees to approximately 100 degrees, preferably approximately 90 degrees. In addition, the first welding portion 146a and the short side of the bottom portion 141 may have an angle of approximately 40 degrees to 50 degrees, preferably approximately 45 degrees, and the second welding part 146b and the short side of the bottom portion 141 may also have an angle of approximately 40 degrees to 50 degrees, preferably approximately 45 degrees.

In this way, according to the embodiment of the present invention, the first short side portion 144a may be bent and extend from the bottom portion 141, the second and third short side portions 144b and 144c may be bent and extend from the long side portions 142 and 143, respectively, and side bent portions 142a and 143a having a radius of curvature gradually increasing as they go farther away from the bottom portion 141 may be formed between the long side portion 142 and the second short side portion 144b and between the long side portion 143 and the third short side portion 144c, respectively, thereby improving the strengths of the bottom portion 141, the long side portions 142 and 143 and the short side portions 144 and 145 and cooling performance.

In some examples, before forming the welding portion 146, temporary welding portions may first be formed on a boundary region between the first short side portion 144a and the second short side portion 144b, a boundary region between the first short side portion 144a and the third short side portion 144c, and/or a boundary region between the second short side portion 144b and the third short side portion 144c. A plurality of temporary welding portions may be formed to be spaced apart from one another. In some examples, the temporary welding portions may be formed in an approximately dotted line shape. By such temporary welding portions, a spring-back phenomenon probably occurring to the long side portions 142 and 143, the short side portions 144 and 145 and the bottom portion 141 may be prevented. In addition, by the temporary welding portions, the long side portions 142 and 143 and the short side portions 144 and 145 may be securely fixed to each other, thereby easily forming a main welding portion 146 (that is, the welding portion 146). The temporary welding portions may be formed not only by laser but also by ultrasonic welding or resistance welding.

While the foregoing embodiment has been provided for carrying out the secondary battery according to the present invention, it should be understood that the embodiment described herein should be considered in a descriptive sense only and not for purposes of limitation, and various changes in form and details may be made therein without departing from the spirit and scope of the disclosure as defined by the following claims.

The invention claimed is:

1. A secondary battery comprising:
an electrode assembly;
a case in which the electrode assembly is accommodated; and
a cap assembly coupled to the case for sealing the case,
wherein the case comprises a bottom portion, a long side portion bent and extending from the bottom portion, a short side portion bent and extending from the long side portion, and a side bent portion provided between the long side portion and the short side portion and extending continuously and uninterrupted from the bottom portion to the cap assembly, and
wherein the side bent portion has a radius of curvature that increases in a direction from the bottom portion to the cap assembly.

2. The secondary battery of claim 1, wherein the short side portion includes a first short side portion bent and extending from the bottom portion, and a second short side portion bent and extending from the long side portion, and the first short side portion and the second short side portion are connected to each other.

3. The secondary battery of claim 2, further comprising a welding portion provided between the first short side portion and the second short side portion.

4. A secondary battery comprising:
an electrode assembly:
a case in which the electrode assembly is accommodated; and
a cap assembly coupled to the case for sealing the case,
wherein the case comprises a bottom portion, a long side portion bent and extending from the bottom portion, a short side portion bent and extending from the long side portion, and a side bent portion provided between the long side portion and the short side portion,
wherein the side bent portion has a radius of curvature increasing as it goes farther from the bottom portion, and
wherein the radius of curvature of the side bent portion gradually increases from 1.2 mm to 3.0 mm.

5. The secondary battery of claim 1, wherein a long side bent portion is provided between the bottom portion and the long side portion, a short side bent portion is provided between the bottom portion and the short side portion, and the long side bent portion and the short side bent portion have a constant radius of curvature.

6. The secondary battery of claim 5, wherein the long side bent portion and the short side bent portion have a radius of curvature equal to or smaller than a smallest radius of curvature of the side bent portion.

7. The secondary battery of claim 5, wherein the radius of curvature of the long side bent portion and the short side bent portion is 1.0 mm to 1.2 mm.

8. The secondary battery of claim 1, wherein the width of the side bent portion gradually increases as it goes farther away from the bottom portion.

9. The secondary battery of claim 1, wherein the width of the long side portion gradually decreases as it goes farther away from the bottom portion.

10. The secondary battery of claim 1, wherein the width of the short side portion gradually decreases as it goes farther away from the bottom portion.

* * * * *